United States Patent [19]

McClain

[11] 4,198,002
[45] * Apr. 15, 1980

[54] REACTOR DISTRIBUTION DUCT

[75] Inventor: Robert W. McClain, Dallas, Tex.

[73] Assignee: Glitsch, Inc., Dallas, Tex.

[*] Notice: The portion of the term of this patent subsequent to Oct. 31, 1995, has been disclaimed.

[21] Appl. No.: 916,377

[22] Filed: Jun. 16, 1978

Related U.S. Application Data

[63] Continuation-in-part of Ser. No. 765,717, Feb. 4, 1977, Pat. No. 4,123,008.

[51] Int. Cl.² ............................................. B01J 8/12
[52] U.S. Cl. ................................... 239/568; 239/559; 422/211
[58] Field of Search ............... 239/548, 552, 556, 557, 239/559, 566–568; 261/97, 98; 422/211, 220; 138/63

[56] References Cited

U.S. PATENT DOCUMENTS

| | | | |
|---|---|---|---|
| 272,764 | 2/1883 | Deters | 138/163 X |
| 521,621 | 6/1894 | Lindemann | 138/163 X |
| 2,016,928 | 10/1935 | Lombardi | 239/548 |
| 2,639,224 | 5/1953 | McAfee | 23/288 R |
| 3,858,540 | 1/1975 | Berg | 138/163 X |
| 3,886,981 | 6/1975 | Eliason | 138/163 X |

FOREIGN PATENT DOCUMENTS

| | | | |
|---|---|---|---|
| 206868 | 12/1959 | Fed. Rep. of Germany | 23/288 R |
| 37265 | 11/1930 | France | 23/288 R |
| 1118750 | 7/1968 | United Kingdom | 23/288 R |

Primary Examiner—Robert W. Saifer
Attorney, Agent, or Firm—John E. Wilson; Marvin A. Naigur; John J. Herguth, Jr.

[57] ABSTRACT

A distribution duct for a reactor which can be easily fabricated. The duct has an elongated back plate and an elongated perforated front plate made up of flat segments separated by elongated angular breaks, and two flat marginal edge portions on the opposite sides thereof, the marginal edge portions being in flush engagement with, and secured to the back plate adjacent to the sides thereof, the flat segments defining with the back plate a flow chamber.

7 Claims, 5 Drawing Figures

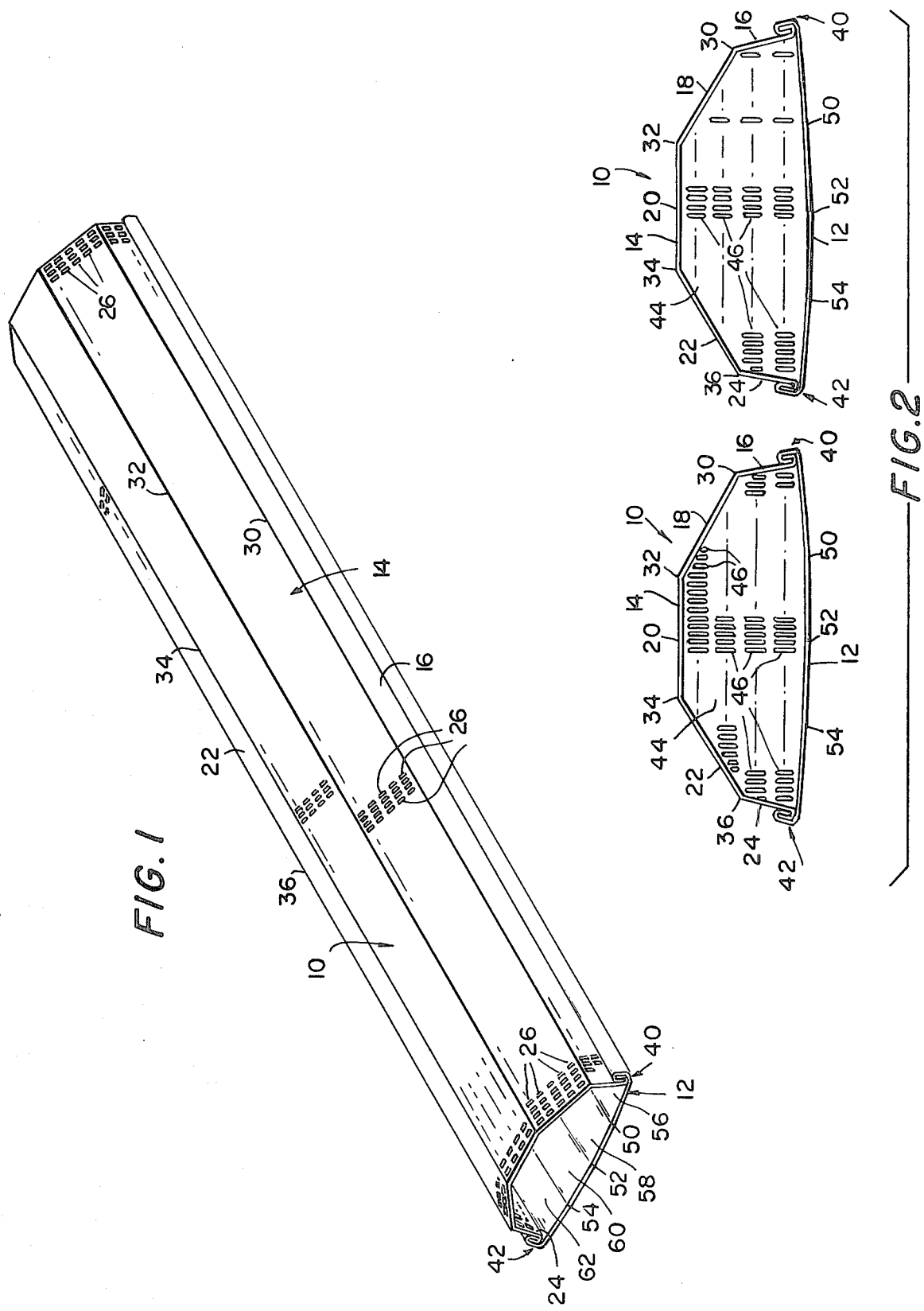

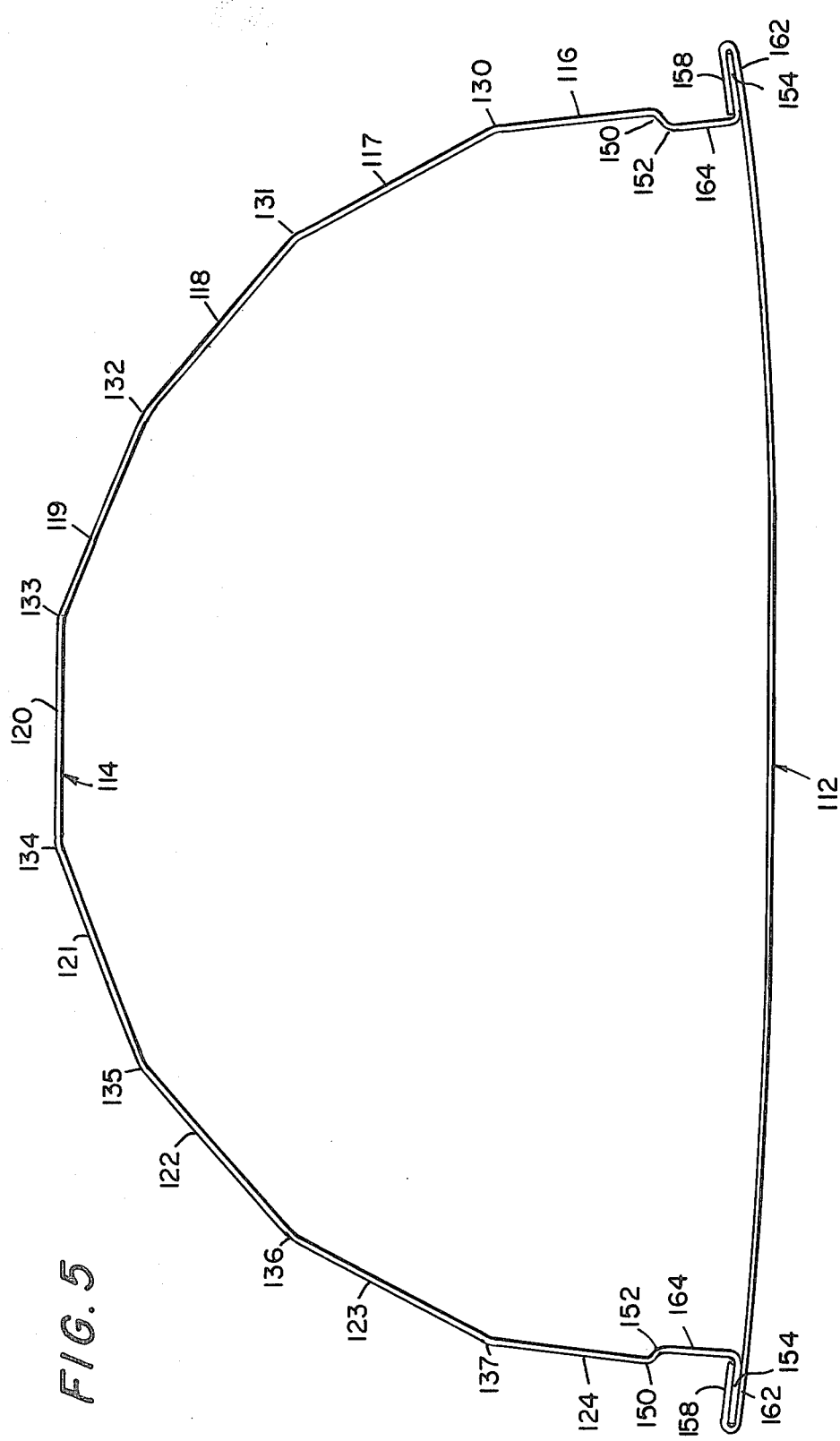

REACTOR DISTRIBUTION DUCT

CROSS REFERENCE TO A RELATED APPLICATION

This is a continuation-in-part of copending Application Ser. No. 765,717 filed Feb. 4, 1977 now U.S. Pat. No. 4,123,008.

BACKGROUND OF THE INVENTION

In industrial processes, such as hydrocarbon conversion processes, chemical reactions take place in a reactor vessel containing a catalyst bed. A fluid is brought into contact with the bed by flowing it downward close to the walls of the reactor vessel and then inward into contact with the catalyst.

In one arrangement the fluid passes downward through perforated ducts which extend into the reactor vessel and flows out of the perforations along the length of the duct and into contact with the catalyst. The ducts used heretofore have consisted of an elongated back plate which is secured to the inside wall of the reactor vessel and a perforated front plate which is concave in cross section. The front plate and back plate are joined along their sides to define a flow chamber.

Such ducts have certain disadvantages. The front plate is conventionally formed by rolling it. Conventional rolling procedures cannot reliably form a front plate having side edges lying on a straight line. Thus, it is difficult to join the front plate to the back plate. If they are successfully joined by conventional techniques, the duct will often be stressed so that it will be structurally weak.

SUMMARY OF THE INVENTION

It is an object of the present invention to overcome drawbacks found in the prior art such as those discussed above. Accordingly, an improved distribution duct is provided with an elongated back plate, an elongated front plate having a plurality of elongated perforated flat segments which are separated by elongated angular breaks, and two marginal portions on the opposite sides thereof, said marginal edge portions being in engagement with and secured to said back plate adjacent to the sides thereof, said front plate defining with said back plate a flow chamber.

BRIEF DESCRIPTION OF THE DRAWINGS

FIG. 1 is a perspective view showing a duct made in accordance with the present invention;

FIG. 2 is an end view of several of the ducts of FIG. 1;

FIGS. 4 and 5 are end views of the embodiment of FIG. 3, each showing a stage in the formation of seams thereon.

DETAILED DESCRIPTION OF THE PREFERRED EMBODIMENT

Figure 3:
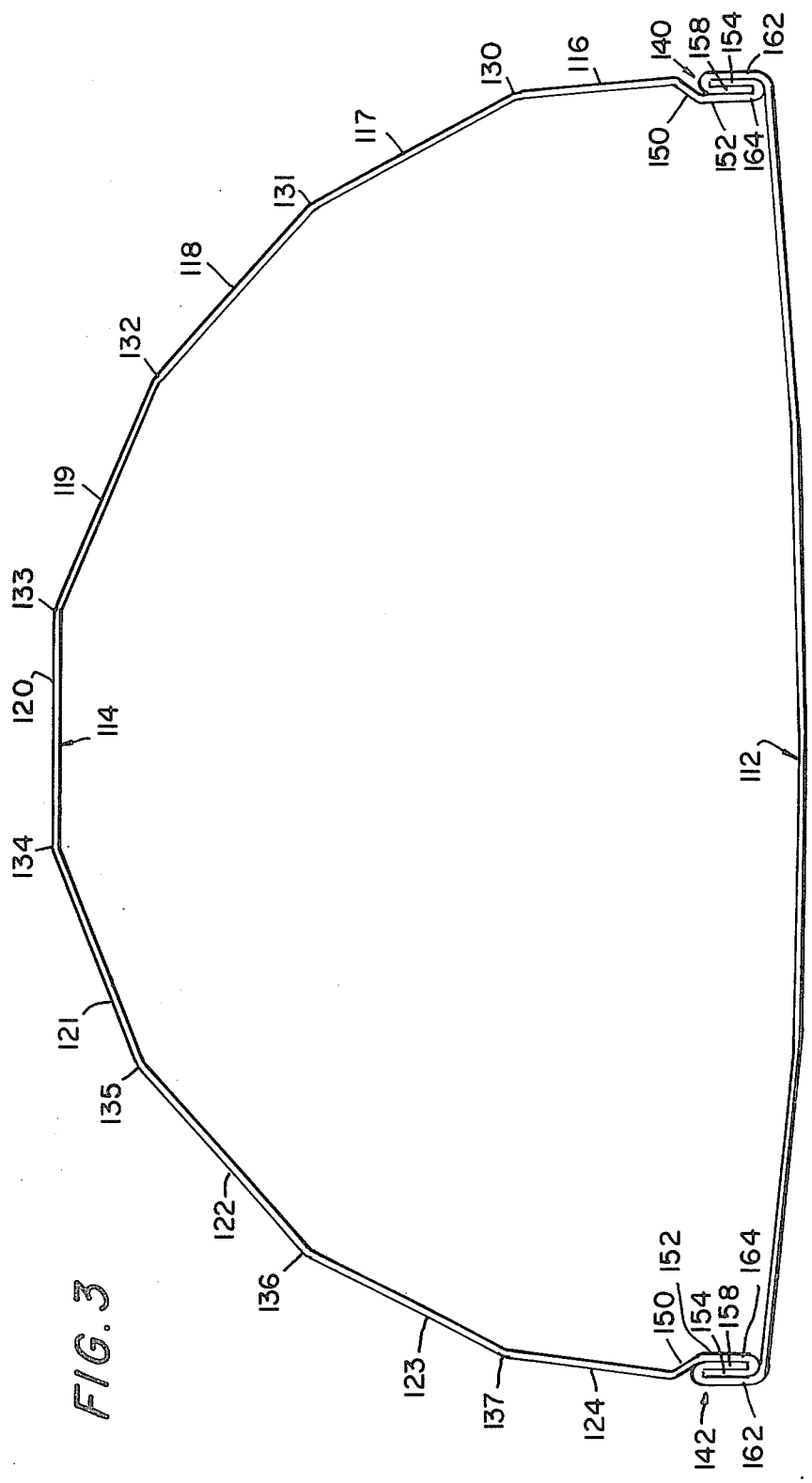
FIG. 3 is a sectional view of a second embodiment of the present invention.

The duct indicated generally as 10 and shown in perspective in FIG. 1 has an elongated back plate 12 and an elongated front plate 14. The front plate 14 consists of a plurality of elongated flat segments 16, 18, 20 and 24 and each of the flat segments has many perforations 26. The flat segments are separated by a number of parallel angular breaks 30, 32, 34 and 36.

Both of the sides of the front plate 14 are joined along their lengths at seams 40 and 42 to the sides of the back plate 12. The structure of the seams is explained in the description of the embodiment of FIGS. 3, 4 and 5.

In FIG. 2, two ducts are shown from the ends thereof. They are spaced apart laterally a distance comparable to that which would be appropriate for some applications. The end plates 44, which cover the ends of the ducts, each has a plurality of perforations 46. In practice the end plates 44 would be placed in the ends of the duct other than the ends where the fluid would be introduced.

Although the perforations 26 and 46 are shown in perpendicular rows, it is understood that they could be arranged differently. For example, they could be arranged so that perforations in adjacent rows are not aligned with one another. It has been found that such an arrangement allows the front plate to be formed with less internal stress than when the perforations are aligned as shown.

When a duct 10 is in use fluid flows longitudinally through it and is distributed through the perforations 26 in the front plate 14 and perforations 46 in the end plate 44. The back plate 12 is not flat over its width, having longitudinally extending angular breaks 50, 52 and 54 defining the longitudinally extending flat panels 56, 58, 60 and 62. The back plate 12 is thus contoured to fit against the inside wall of a reactor which is generally cylindrical in configuration when the duct 10 is positioned to extend parallel to the longitudinal axis of the reactor.

FIG. 3 shows a modification which differs from the embodiment of FIGS. 1-2 in that it has a front plate 114 with a greater number of flat segments than the plate 14 of FIG. 1. Instead of five flat segments, it has nine flat segments. If desired, a front plate of seven flat segments or any other number could be used. The front plate 114 has flat segments 116, 117, 118, 119, 120, 121, 122, 123 and 124 and angular breaks 130, 131, 132, 133, 134, 135, 136 and 137 between the flat segments as shown. The back plate 12 is similar to the ones shown in FIGS. 1 and 2 in that it has flat segments joined by angular breaks. The front plate 114 is secured to the back plate 112 at seams 140 and 142 secured to the back plate 12 as are the marginal edge portions which are the same as the seams 40 and 42 of the first embodiment.

Figure 4:
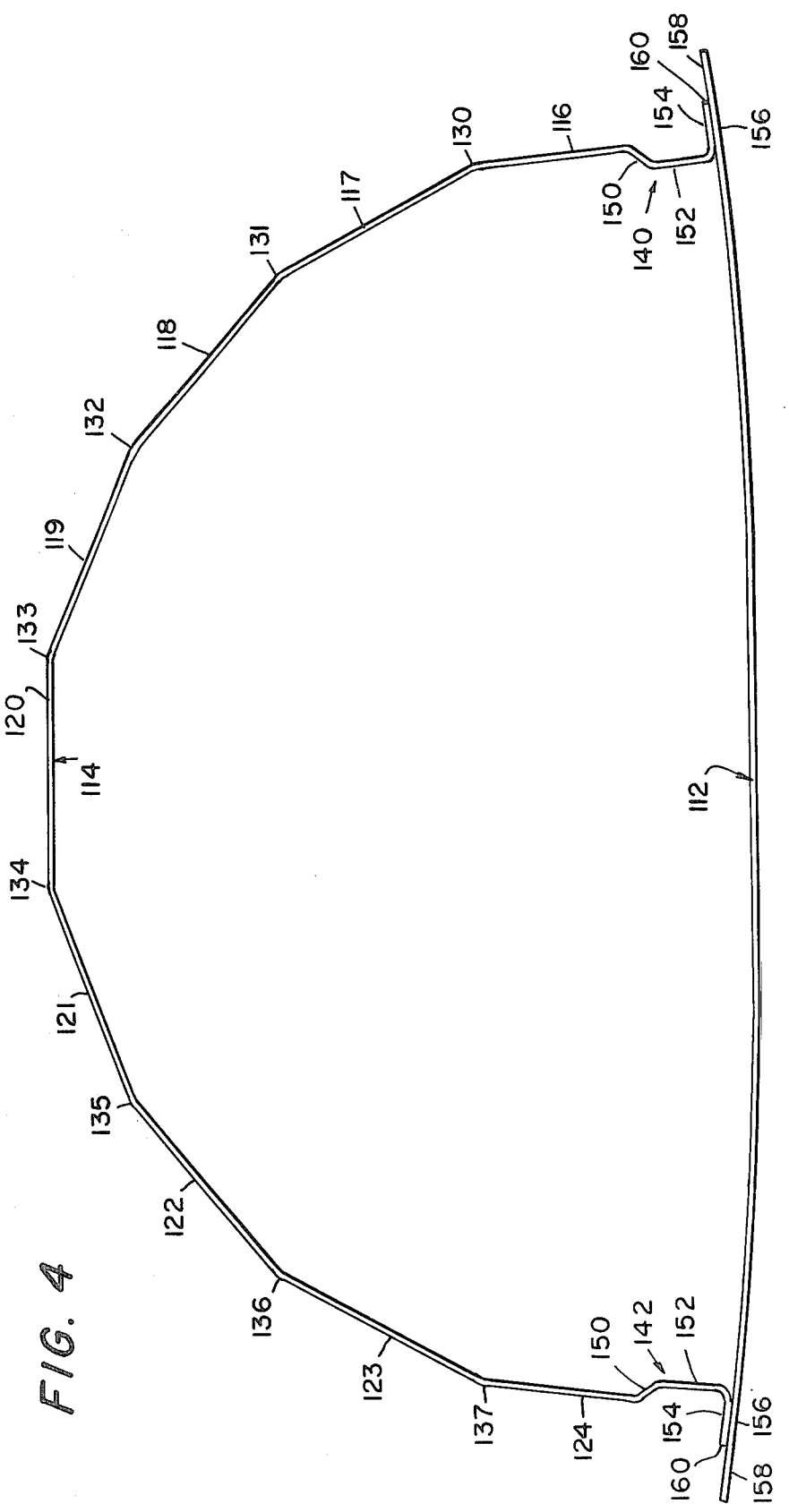

As in the first embodiment, the embodiment of FIG. 4 has many perforations (not shown in FIGS. 3, 4 and 5) on the flat segments. These may be arranged in any manner, for example, they may be arranged in perpendicular rows or they may be arranged so that perforations are not aligned with those in adjacent rows.

The seams 140 and 142 are each formed by folding the metal in the marginal side portions of the front plate 114 and back plate 112 together to form a crimped seam. The seams 140 and 142 are shown best perhaps in FIG. 3. They each lay adjacent to a bend 150, which serves to allow the formation of seams which do not project laterally beyond the sides of the front plate 114. This feature permits ducts to be placed closely together around the reactor wall.

Each of the seams 140 and 142 consist of four layers, two of which are formed out of the back plate 112 and two of which are formed out of the front plate 114. Since the seams 140 and 142 are identical in the described embodiment, the formation of only one of them, the seam 140, will be described.

A marginal portion 152 below the bend 150 is worked so that the part of the marginal portion 152 farthest from the bend 150 is formed into an outward projecting flange 154. As shown in FIG. 4, the front plate 114 is placed into contact with the back plate 112 so that the flange 154 is in flush engagement with the marginal side portion 156 of the back plate 112. The parts are dimensional so that a hook portion 158 of the marginal side portion 156 projects a preselected distance laterally beyond the free end 160 of the flange 154.

Next, the hook portion 158 is folded over the flange 154 as shown in FIG. 4. At this stage the front plate and back plate are secured together because the flange 154 is held between the hook portion 158 and an outer wall portion 162 which is the part of the marginal side portion 156 of the back plate 112 which is not included in the hook portion 158.

The seam 140 is completed by folding the flange 154 upwardly so that it is parallel to an inner wall portion 164, which is the part of the marginal portion 152 of the front plate 114 which is not included in the flange 154.

The finished seam 140 is shown in cross section in FIG. 3. It includes the outer wall portion 162 and the flange 154 which is clasped between the outer wall portion 162 and the hook portion 158. The hook portion 158 is clasped between the flange 154 and the inner wall portion 164. The hook portion 154 is integral with the outer wall portion 162 and the inner wall portion 164 is integral with the flange 154 as shown.

The seam 142 has parts identical to those of the seam 140 and therefore need not be described in detail.

The seams 40 and 42 of FIGS. 1 and 2 are similar to the seams 140 and 142 of FIGS. 3, 4 and 5. There is no bend in the embodiment of FIGS. 1 and 2 equivalent to the bend 150 of the embodiment of FIGS. 3, 4 and 5 but such a bend could be incorporated in the embodiment of FIGS. 1 and 2 to the same effect and advantages realized by its employment in the embodiment of FIGS. 3, 4 and 5.

The foregoing describes but several preferred embodiments of the present invention, other embodiments and modifications being possible without exceeding the scope of the present invention as described in the following claims.

What is claimed is:

1. An improved distribution duct for a reactor vessel comprising:
    an elongated back plate having two back plate marginal side portions;
    elongated front plate having a plurality of elongated perforated integral flat segments separated by elongated angular breaks, two front plate marginal side portions on the opposite sides of said front plate, said marginal side portions of said front plate each being crimped together with one of said marginal side portions of said back plate to form a seam, said flat segments and said back plate defining a flow chamber.

2. The improved distribution duct defined in claim 1 wherein said front plate marginal portion comprises a flange portion, and said back plate marginal portion comprises a hook portion and an integral outer wall portion, said flange being clasped between said outer wall portion and said hook portion.

3. The improved distribution duct defined in claim 2 wherein said front plate marginal side portions each further comprise an inner wall portion, said hook portion being clasped between said inner wall portion and said flange portion.

4. The improved distribution duct defined in claim 1 wherein said back plate is made up of a plurality of longitudinal integral flat panels joined at longitudinally extending annular breaks.

5. The improved distribution duct defined in claim 1 wherein there are five perforated flat segments.

6. The improved distribution duct defined in claim 1 wherein there are nine perforated flat segments.

7. The improved distribution duct defined in claim 1 further comprising a perforated end plate adjacent to one end of said duct and perpendicular to said front plate and said back plate.

* * * * *